United States Patent [19]
Saito et al.

[11] Patent Number: 5,719,645
[45] Date of Patent: Feb. 17, 1998

[54] ELECTRONIC APPARATUS HAVING DISPLAY DEVICE

[75] Inventors: Yoshihiro Saito, Hachioji; Masahiko Ito, Tokyo, both of Japan

[73] Assignee: Canon Kabushiki Kaisha, Tokyo, Japan

[21] Appl. No.: 872,995

[22] Filed: Jun. 11, 1997

Related U.S. Application Data

[63] Continuation of Ser. No. 353,907, Dec. 12, 1994, abandoned.

[30] Foreign Application Priority Data

Dec. 15, 1993 [JP] Japan ..................... 5-343145

[51] Int. Cl.$^6$ .................. H04N 5/645; H04N 5/655
[52] U.S. Cl. .................. 348/818; 348/826; 348/827
[58] Field of Search .................. 348/825–827, 348/832–836; 345/173, 905

[56] References Cited

U.S. PATENT DOCUMENTS

| | | | |
|---|---|---|---|
| 4,814,759 | 3/1989 | Gombrich et al. | 345/905 |
| 5,103,376 | 4/1992 | Blonder | 361/393 |
| 5,179,447 | 1/1993 | Lain | 348/827 |

FOREIGN PATENT DOCUMENTS

| | | | |
|---|---|---|---|
| 0364827 | 4/1990 | European Pat. Off. | H04N 1/04 |
| 0371642 | 6/1990 | European Pat. Off. | H05L 5/00 |
| WO9012356 | 4/1992 | France | G06F 1/00 |
| 4-03020774A | 1/1991 | Japan | 345/905 |
| 4-03150588A | 6/1991 | Japan | 345/905 |
| 4-04221989a | 8/1992 | Japan | 345/905 |
| 4-04355491A | 12/1992 | Japan | 345/905 |
| 4-05011707A | 1/1993 | Japan | 345/905 |

Primary Examiner—Thomas D. Lee
Assistant Examiner—Jerome Grant, II
Attorney, Agent, or Firm—Fitzpatrick, Cella, Harper & Scinto

[57] ABSTRACT

In an electronic apparatus provided with a display device, hinge portions for rotatably holding the display device on the apparatus body are provided in two portions on the display device, and the display device is so arranged that it is rotatable in one direction about one hinge portion or rotatable in another direction about the other hinge portion.

21 Claims, 14 Drawing Sheets

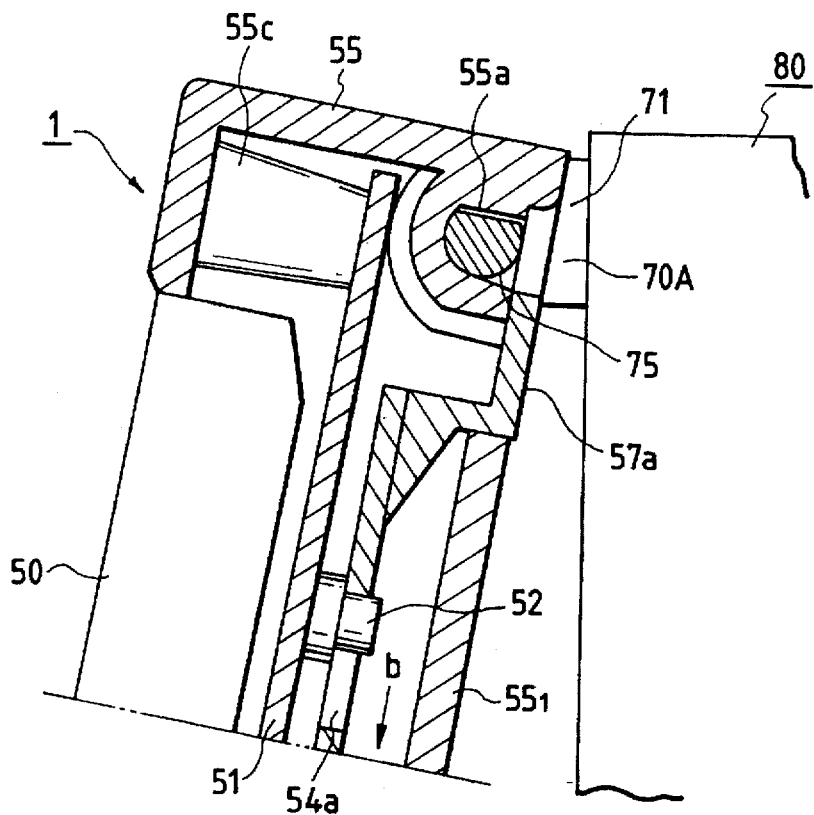
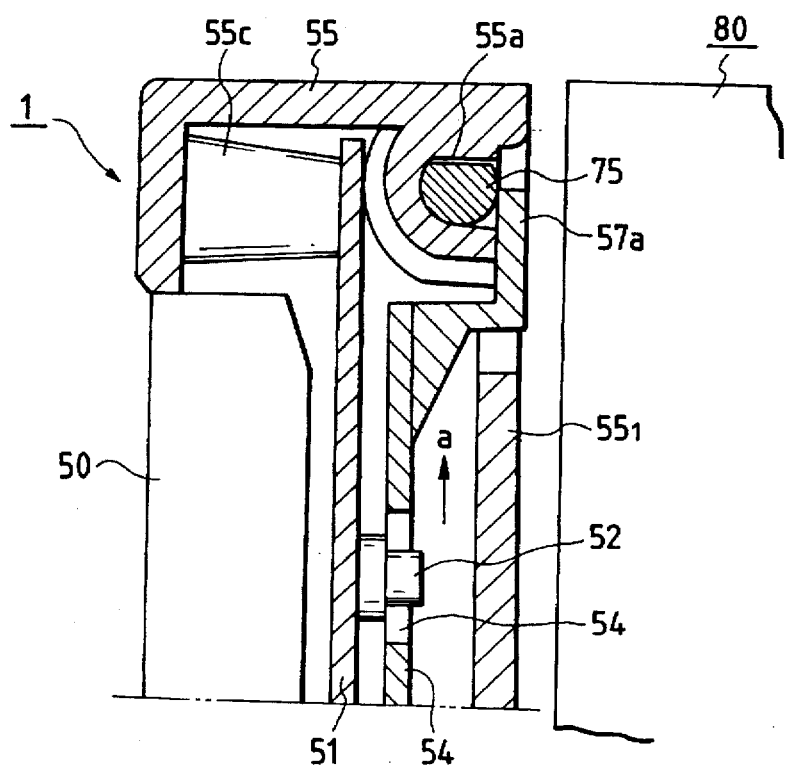

ELECTRONIC APPARATUS HAVING DISPLAY DEVICE

This application is a continuation of application Ser. No. 08/353,907 filed Dec. 12, 1994, now abandoned.

BACKGROUND OF THE INVENTION

1. Field of the Invention

The present invention relates to an electronic apparatus having a display device (image display apparatus) as a part of the apparatus body, for example like image recording apparatus such as electronic filing systems (magnetooptical disk systems), word processors, personal computers, microfilm readers, microfilm reader printers, etc.

2. Related Background Art

FIG. 18 shows schematic structure of an example of the electronic apparatus including a display device as a part of the apparatus body. The apparatus of this example is an electronic filing system.

Reference numeral 80 designates the apparatus body and 1 a display device set on the front surface of the apparatus body. This example employs a thin display device such as a liquid crystal display device in order to construct the entire apparatus in a compact size. The display device is fixed in a fixed angular posture at a predetermined angle to the apparatus body 80.

Numeral 2 denotes a document mount portion projecting this side from the front surface of apparatus below the display device 1. Sheet documents S are loaded on the document mount portion 2. The loaded documents S are fed one by one from the top by a sheet feed roller 3, and a document is separated by a separator composed of a reversing roller 4 and a feeding roller 5 to be drawn into the apparatus body 80. Alternatively, a document S may be supplied by hand through the document mount portion 2 into a sheet feed port 2a, so that the hand-supplied document is drawn into the apparatus body 80 by the sheet feed roller 3 and the separator 4, 5.

The document S drawn into the apparatus body 80 is conveyed from bottom to top in the apparatus body 80 through a path of from a pair of guide plates 12, 13, via a pair of conveying rollers 6, 7 and another pair of conveying rollers 8, 9 to a pinch-and convey belt apparatus 14, 15, and then is discharged onto a discharge tray portion 16 provided this side of the upper surface of the apparatus body 80.

In the conveying process of this document first and second image reading units 10, 11 set on either side of the conveying path photoelectrically read image information on the front side and on the back side of the document at first and second reading positions A, B, respectively, between the paired conveying rollers 6, 7 and the paired conveying rollers 8, 9. The first and second image reading units 10, 11 each consist of a document illumination light source, mirrors for guiding image light, an imaging lens, and an image reading sensor such as CCD.

The image information of the document photoelectrically read by the image reading units 10, 11 is recorded in a magnetooptical disk as a detachable recording medium in a magnetooptical recording apparatus 17. The recording medium may be one fixed in the apparatus body, such as a hard disk. At the same time, the thus read image information is displayed on the display apparatus 1, whereby whether reading is fine or not can be checked.

Also, the image information recorded in the recording medium may be displayed on the display device 1 while retrieving it with necessity. The information may also be output as a hard copy by a printing mechanism not shown.

Signals for retrieving information for retrieval and for operation of apparatus are supplied through a keyboard not shown and key switches 20 activated according to the contents displayed on the display device 1. The key switches 20 are arranged in the front portion of display device 1 near the lower edge.

Numeral 18 is an electrical-component portion including a print-circuit board etc. for controlling the power source and the apparatus.

Although the display device 1 in the apparatus of the above example is set in the fixed angular posture at the predetermined angle on the front surface of the apparatus body 80, it is convenient if the display device 1 is arranged as pivotable relative to the apparatus body 80 so as to properly adjust (or tilt) up and down (or, left and right) into an elevation posture or into a depression posture at an appropriate angle (or into a leftward posture or a rightward posture at an appropriate angle) in order to facilitate observation of the image displayed on the display device 1 in accordance with the operator's sitting height or conditions of illumination light, etc.

FIG. 19 shows an apparatus in which the display device 1 is arranged to tilt into an elevation posture or into a depression posture at an appropriate angle as shown by a chain double-dashed line 1a or 1b about a support axis a on the upper edge side of the display device 1, and FIG. 20 shows an apparatus in which the display device 1 is arranged to tilt into an elevation posture or into a depression posture at an appropriate angle as shown by a chain double-dashed line 1a or 1b about a support axis b on the lower edge side of the display device 1.

(i) However, in order to avoid, in the case of the apparatus of FIG. 19, interference between the apparatus body 80 and the lower edge of the display device moving back toward the apparatus with respect to the support axis a when the display device 1 is tilted into the depression posture 1b, or in order to avoid, in the case of FIG. 20, interference between the apparatus body 80 and the upper edge of the display device moving back toward the apparatus with respect to the support axis b when the display device 1 is tilted into the elevation posture 1a, a space for allowing the backward movement of display device is necessary in either case in a length L between the apparatus body 80 and the display device 1. Therefore, the display device 1 needs to be set the length L ahead of the apparatus body 80 as compared with the apparatus in which the display device 1 is set at the fixed angle so as not to tilt as shown in FIG. 18. Thus, the entire apparatus becomes apparently larger, which reduces the effect of the size reduction of the apparatus by using the thin display device 1 such as a liquid crystal display device.

(ii) Where the document mount portion 2 and sheet feed port 2a are provided below the display device 1 to allow supply and discharge of document on the front surface side of apparatus as in the apparatus of this example in order to enhance the operability, and where the display device 1 is set the length L ahead of the apparatus body 80 as in above (i), there occurs a problem of degraded setting performance or hand supply performance of document S onto the document mount portion 2 or into the sheet feed port 2a because of obstruction of the display device 1 jutting out above the document mount portion 2.

Particularly, in the case of the apparatus in which the display device 1 is tilted about the support axis b on the lower edge side of the display device 1 as shown in FIG. 20, the lower edge of the display device 1 is fixed at the position, so that the lower edge is always an obstruction, which makes the problem pronounced.

In the case of the apparatus in which the display device 1 is tilted about the support axis a on the upper edge side of display device 1 as shown in FIG. 19, the operator can move the display device 1 into the depression posture 1b to bring the lower edge of the display device 1 to that side of the document mount portion 2 so as not to be an obstruction. Thus, the above problem can be avoided to some extent upon setting the documents onto the document mount portion 2 or upon supplying the document by hand, though the operator is required to perform a troublesome operation to tilt the display device 1 into the depression posture 1b. This case, however, has another problem that the control of the key switches 20 is not easy, because the position of the key switches 20 arranged in the lower end portion of display device 1 is shifted to that side because of the tilting of display device 1.

SUMMARY OF THE INVENTION

It is, therefore, an object of the present invention to provide an apparatus in which a display device can be tilted at a desired angle without causing the above problems as described in (i) and (ii), thus, without increasing the size of the entire apparatus and without degrading the operability of apparatus.

The present invention is directed to an electronic apparatus having a display device, which has the following structural features.

In an electronic apparatus having a display device as a part of the apparatus body, hinge portions for tilting the display device with respect to the apparatus body are provided on upper and lower sides of the display device, and the apparatus is characterized in that the display device is rotated about the hinge portion on the upper side to tilt the display device upward and the display device is rotated about the hinge portion on the lower side to tilt the display device downward.

The hinge portions for tilting the display device each have a projecting portion having a shaft to become a support shaft for the display device, a U-shaped recess portion to be engaged therewith, a claw member arranged to slide to close an opening portion of the U-shaped recess portion, and control means for controlling a motion of the claw member in such a manner that, in a state where the display device is set on the both hinge portions on the upper and lower sides of apparatus, the claw member is allowed to slide to open the opening portion of the U-shaped recess portion so that only either one of the upper and lower shafts engaged with the U-shaped recess portions can be disengaged, and that, in a state where the display device is tilted while one of the upper and lower hinge portions is disengaged, the shaft, provided in the projecting portion, to become the support shaft is kept not to be disengaged from the engaged state with the U-shaped recess portion.

The apparatus is further characterized in that the hinge portions for tilting the display device are arranged to freely rotate in a direction to tilt the display device through a ratchet mechanism etc. but keep the display device fixed in a returning direction unless it is released by releasing means.

In another electronic apparatus having a display device as a part of the apparatus body, hinge portions for tilting the display device with respect to the apparatus body are provided on left and right sides of the display device, and the apparatus is characterized in that the display device is rotated about the hinge portion on the left side to tilt the display device leftward and the display device is rotated about the hinge portion on the right side to tilt the display device rightward.

BRIEF DESCRIPTION OF THE DRAWINGS

FIG. 13 is a cross-sectional view to show a state in which an upper U-shaped recess portion is engaged with a support shaft of an upper hinge portion;

FIG. 14 is a cross-sectional view to show a state in which an upward claw member stops disengagement of a hinge portion from a recess portion;

FIGS. 17A to 17C show an apparatus of embodiment 3, wherein FIG. 17A shows a state of standard angular posture, and FIG. 17B or FIG. 17C a state in which the display device is tilted in the elevation posture or in the depression posture, respectively;

DETAILED DESCRIPTION OF THE PREFERRED EMBODIMENTS

<Embodiment 1> (FIG. 2 to FIG. 14)

Figure 2:
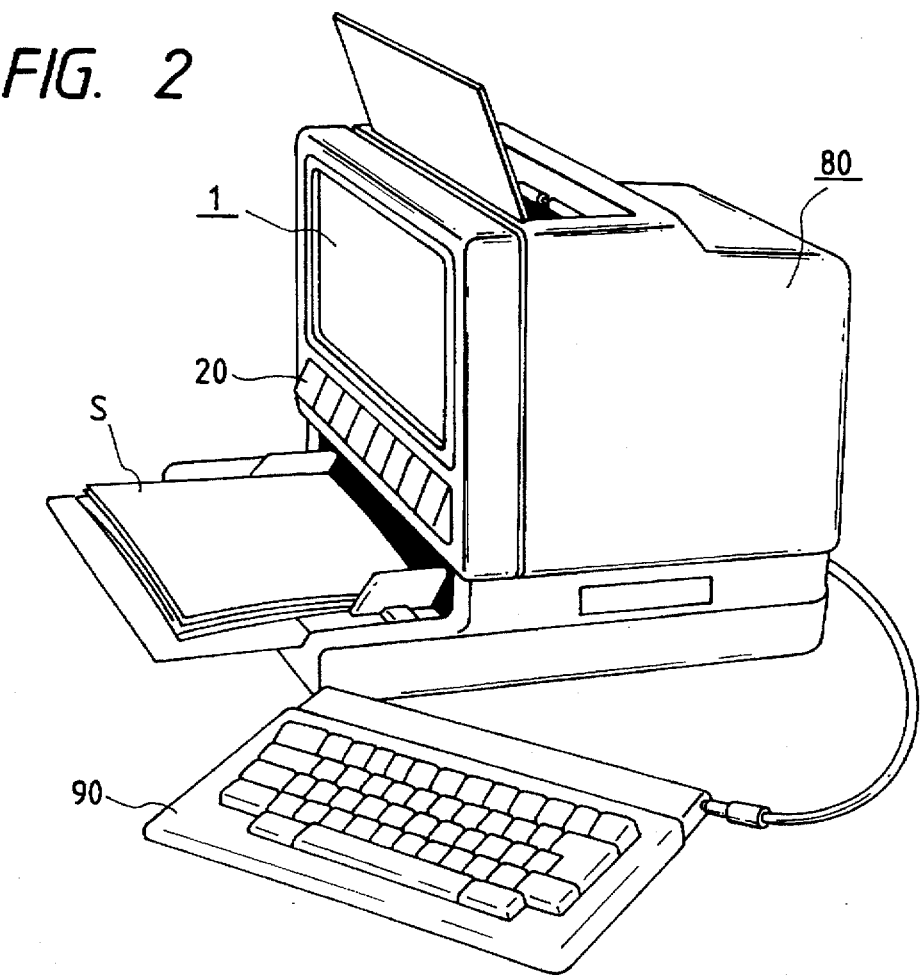
FIG. 2 is a perspective view to show an appearance of an apparatus in embodiment 1.
Figure 3:
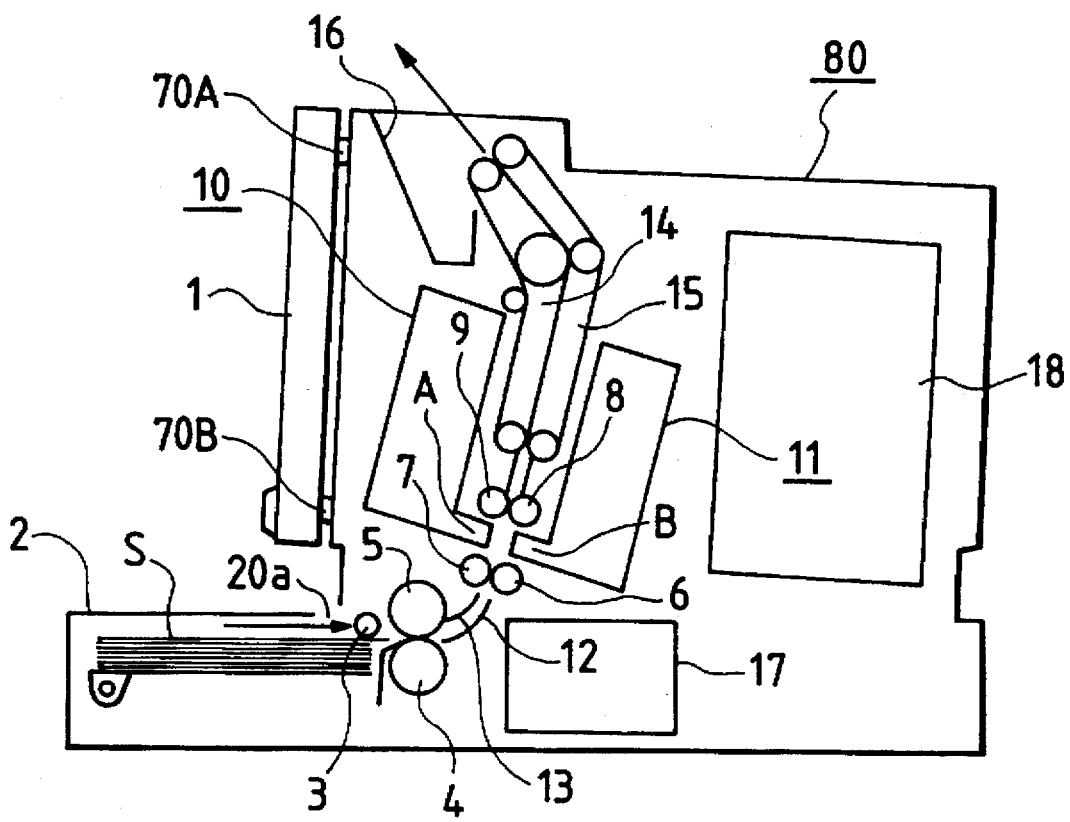
FIG. 3 is a schematic drawing to show an internal mechanism in the apparatus body.
Figure 18:
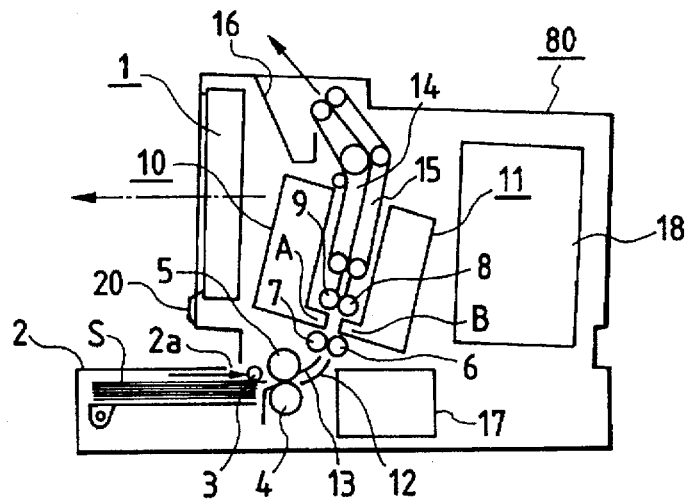
FIG. 18 is a schematic drawing to show the structure of an example of the conventional apparatus.
Figure 19:
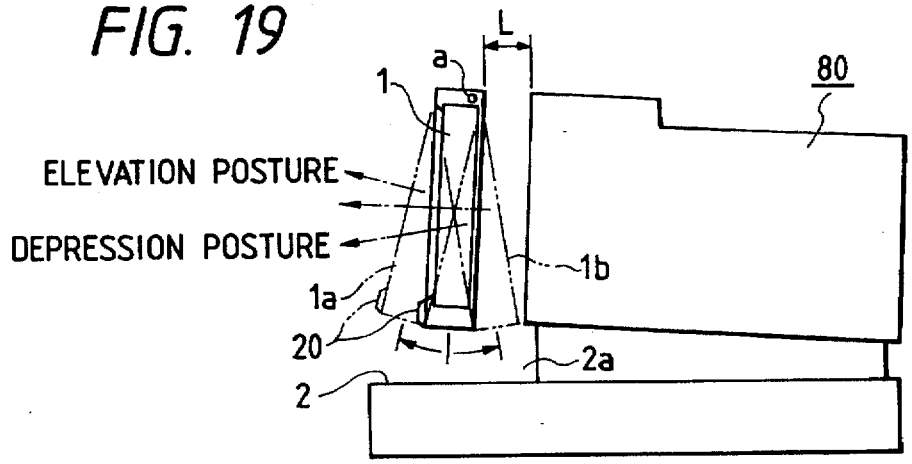
FIG. 19 is a schematic drawing to show an apparatus in which the display device can be tilted about an upper support axis into the elevation posture or into the depression posture.
Figure 20:
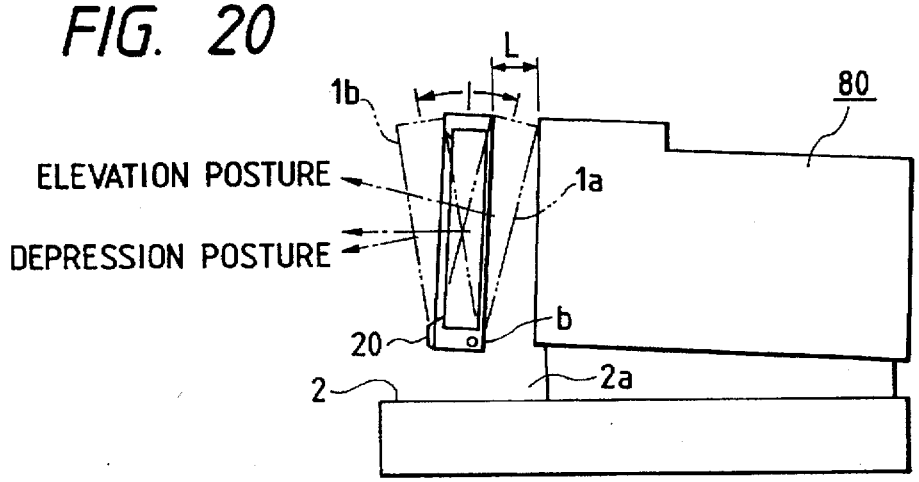
FIG. 20 is a schematic drawing to show an apparatus in which the display device can be tilted about a lower support axis into the elevation posture or into the depression posture.

FIG. 2 is a perspective view to show an appearance of the apparatus of the present embodiment. The apparatus of this example is also an electronic filing system as the above-described apparatus in FIG. 18 was. FIG. 3 is a schematic, vertical cross-sectional side view of the apparatus. The same constituents and portions as those in the above-described apparatus in FIG. 18 are denoted by the same reference numerals and redundant description will be omitted.

In FIG. 2, reference numeral 90 designates a keyboard, and signals for retrieving information for retrieval and for operation of apparatus are supplied through the keyboard 90 into the apparatus body. Also, the signals may be supplied through key switches 20 activated according to the contents displayed on the display device 1. Operations and functions for reading, recording, displaying, etc. of image information of document S are the same as those of the above-described apparatus of FIG. 18.

Figure 1:
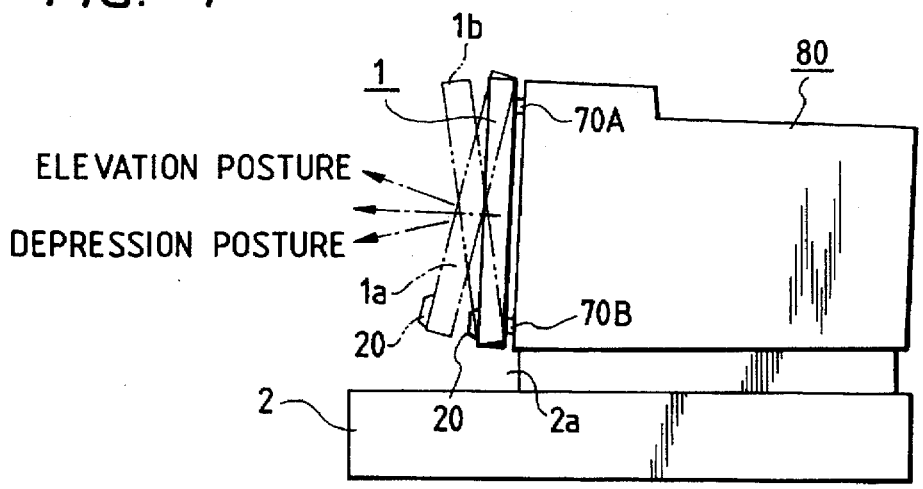
FIG. 1 is a conceptual drawing of an apparatus of the present invention.

The display device 1 is tilted in the manner as described with FIG. 1. The tilting mechanism is next described.

Figure 4:
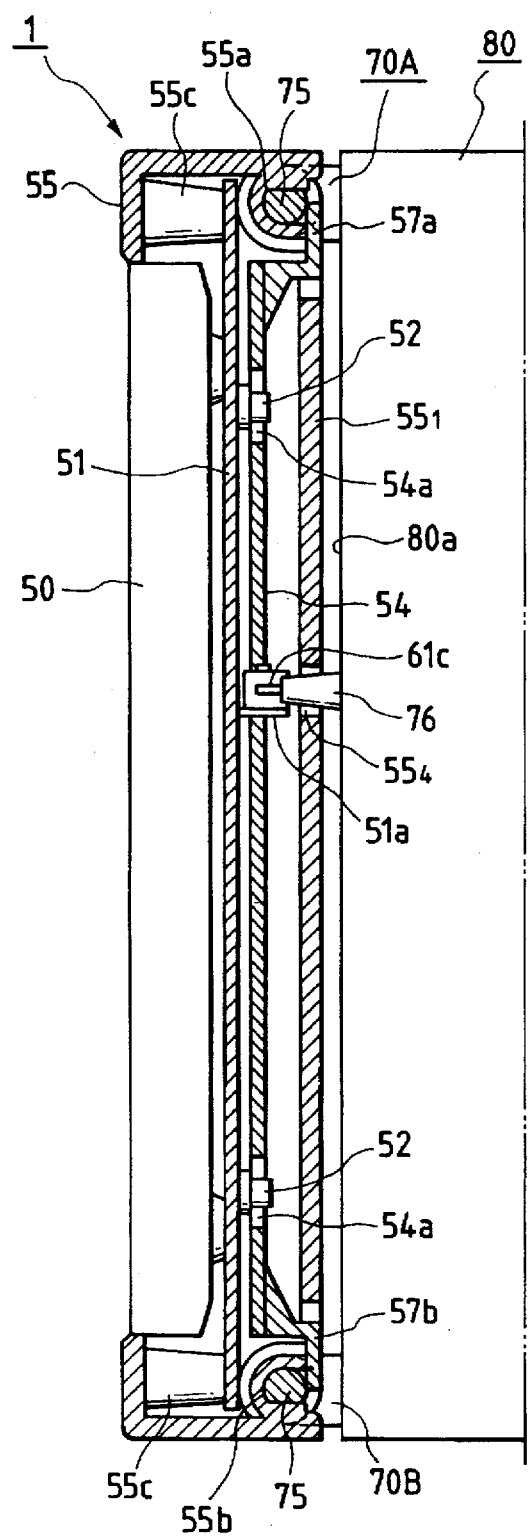
FIG. 4 is a vertical cross-sectional side view of a portion of display device in a state of standard angular posture.
Figure 5:
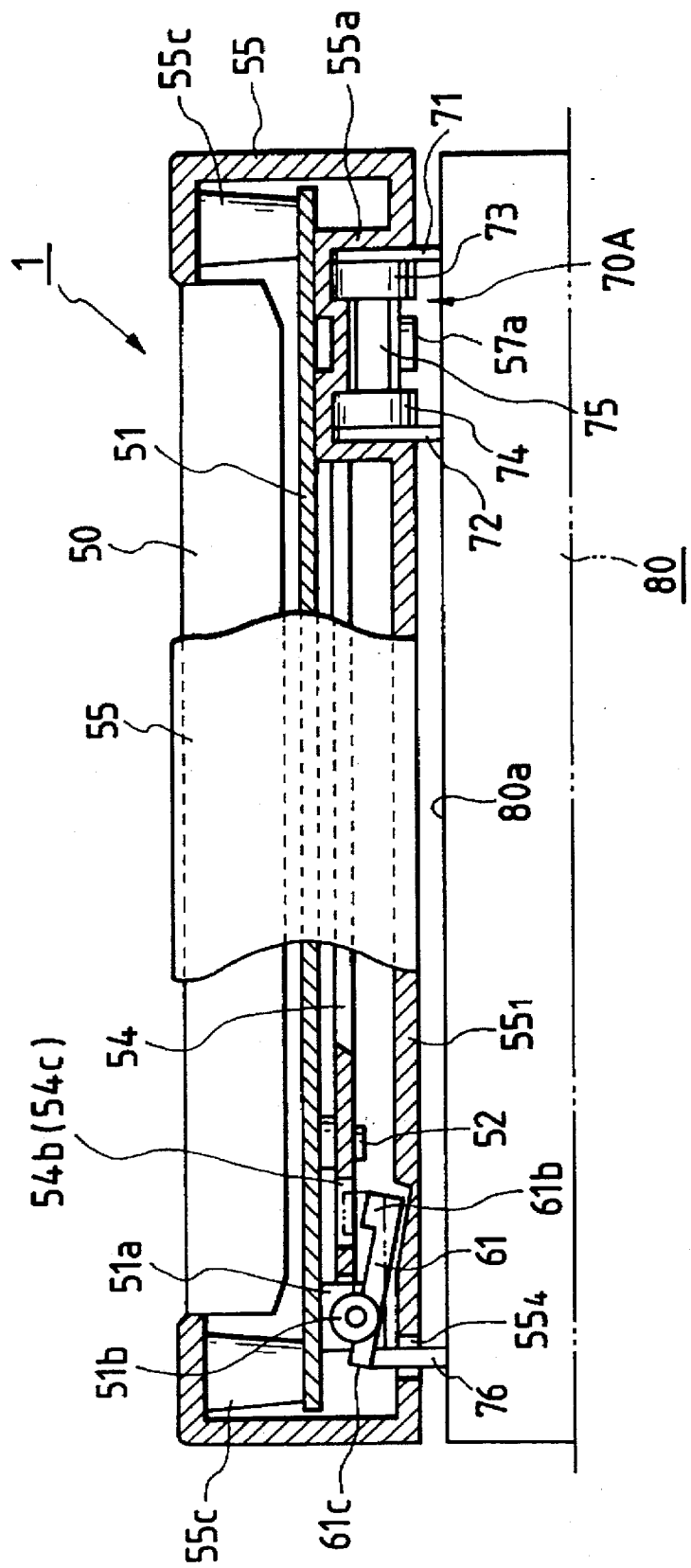
FIG. 5 is a broken plan view of the portion of FIG. 4.

FIG. 4 is a vertical cross-sectional view of the portion of the display device, which shows a state in which the display device 1 is held in the standard angular posture in which the display device 1 is hooked both on hinge portions 70A, 70B on the upper side and on the lower side on the front surface of the apparatus body 80. FIG. 5 is a plan view, partly broken, of the portion of the display device.

Figure 6:
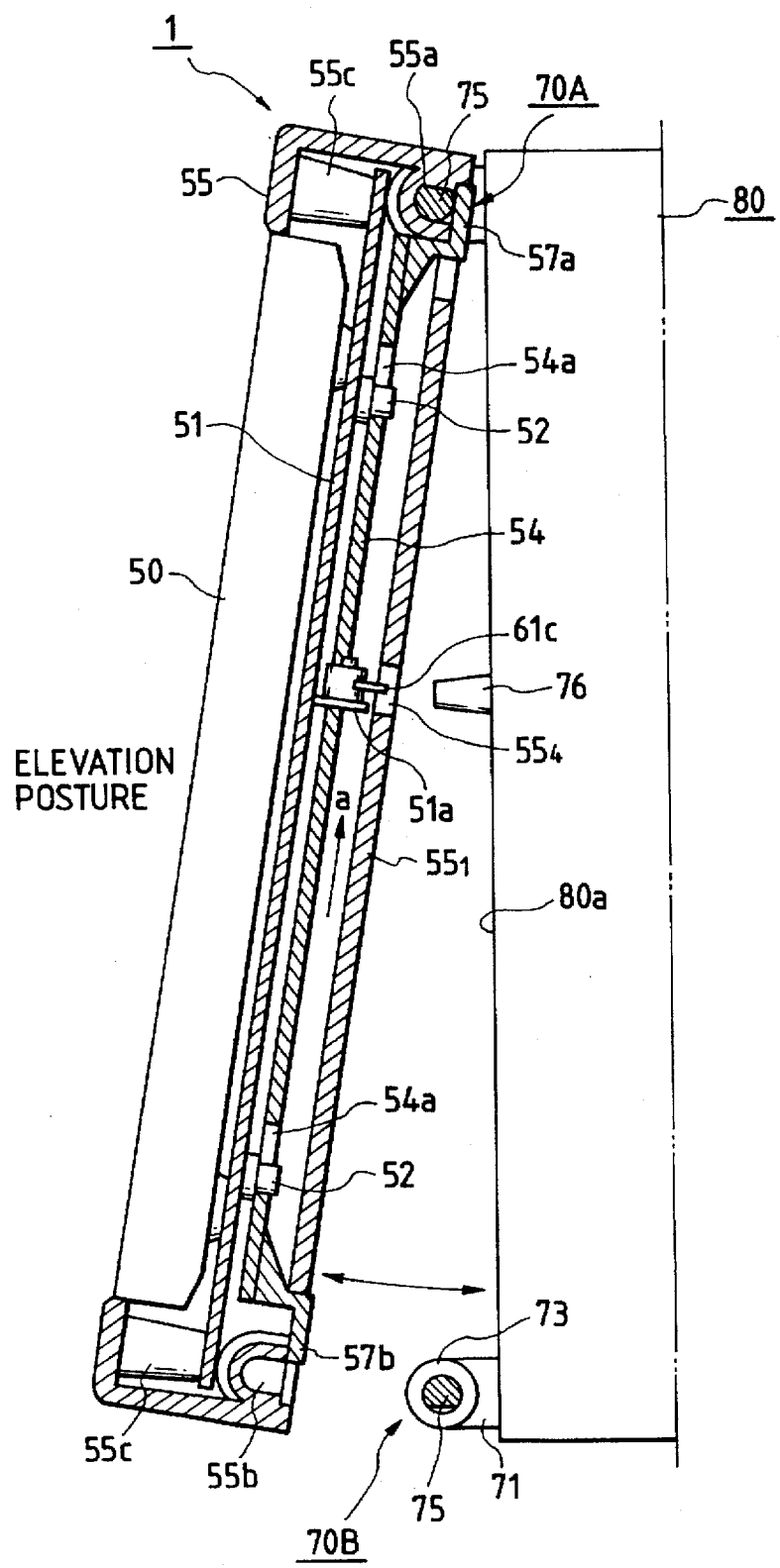
FIG. 6 is a vertical cross-sectional side view of the portion of the display device tilted in the elevation posture at a desired angle.

FIG. 6 shows a state in which the display device 1 is released from the hooked state on the lower hinge portions 70B and then is rotated upward from the standard angular posture of FIG. 4 about the upper hinge portions 70A so as to be tilted in the elevation posture at a desired angle.

Figure 7:
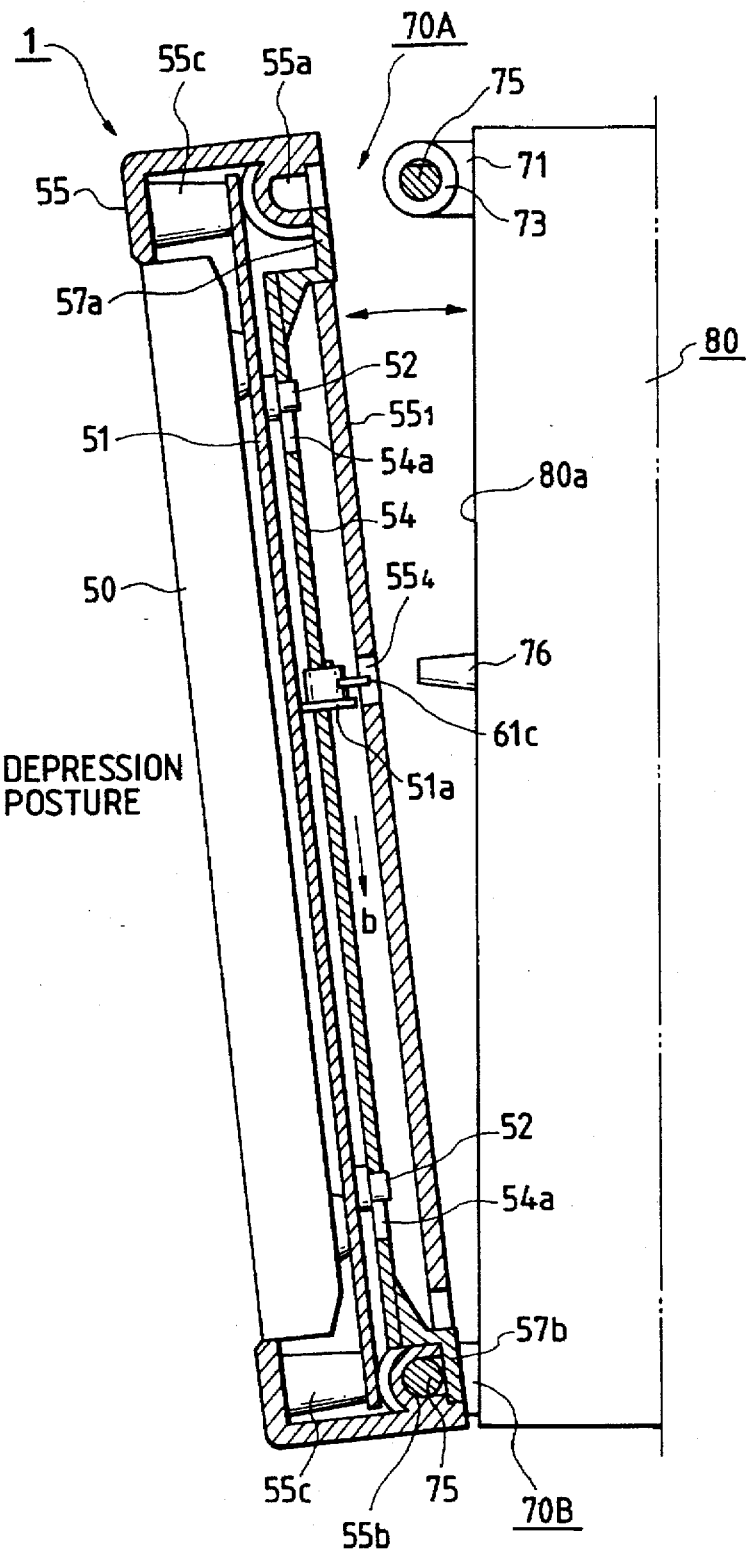
FIG. 7 is a vertical cross-sectional side view of the portion of the display device tilted in the depression posture at a desired angle.

FIG. 7 shows a state in which the display device 1 is released from the hooked state on the upper hinge portions 70A and then is rotated downward from the standard angular posture of FIG. 4 about the lower hinge portions 70B so as to be tilted in the depression posture at a desired angle.

Figure 8:
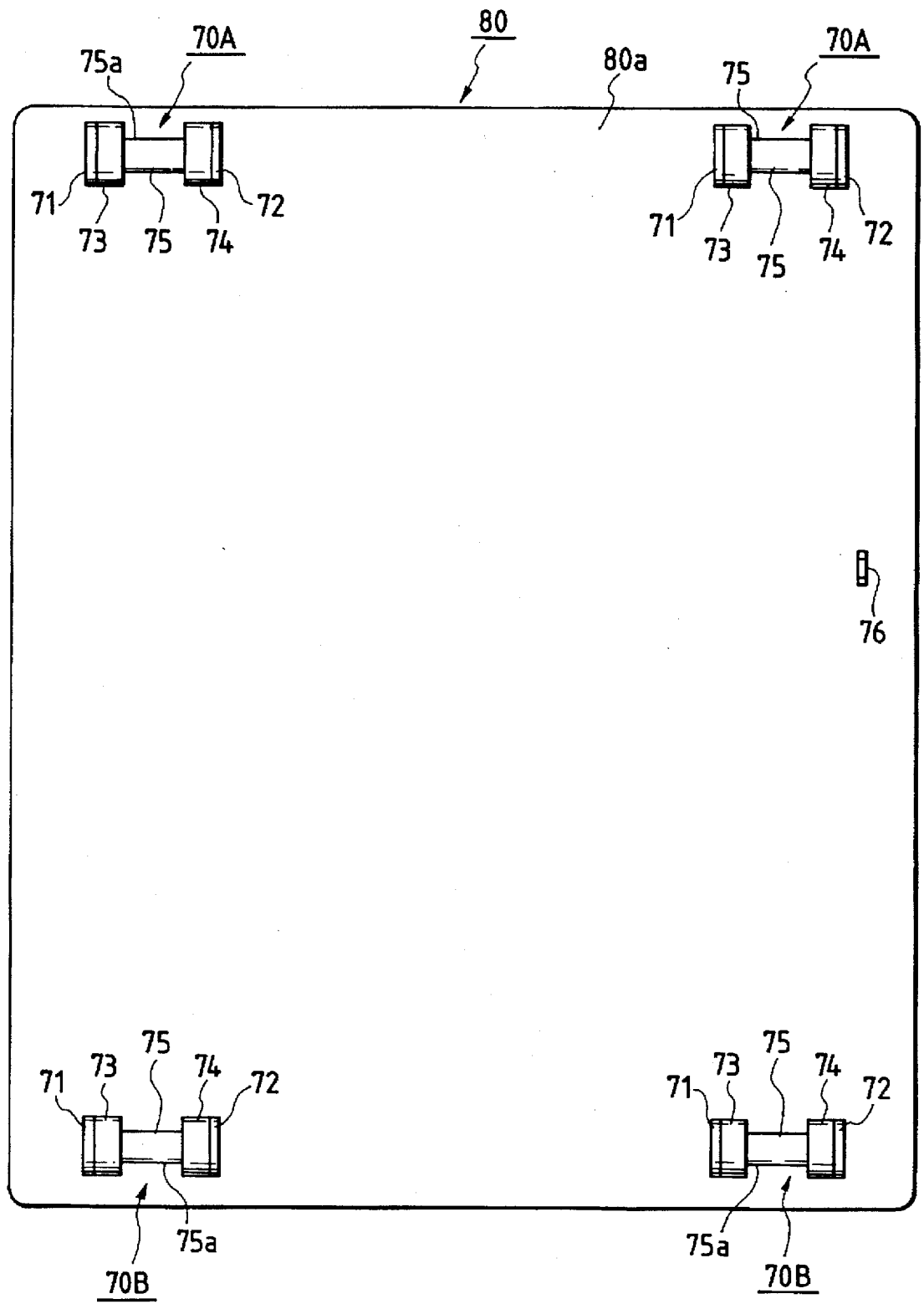
FIG. 8 is an elevation of a front panel portion of the apparatus body to which the display device is mounted.

FIG. 8 is a front elevation of a front panel 80a of the apparatus body 80 to which the display device 1 is mounted. There are a pair of upper hinge portions 70A, 70A in left and right portions on the upper edge side of the front panel 80a, and a pair of lower hinge portions 70B, 70B in left and right portions on the lower edge side, thus four hinge portions in total at the four corners of the front panel 80a. The hinge portions 70A, 70A and 70B, 70B have the same structure.

Figure 9:
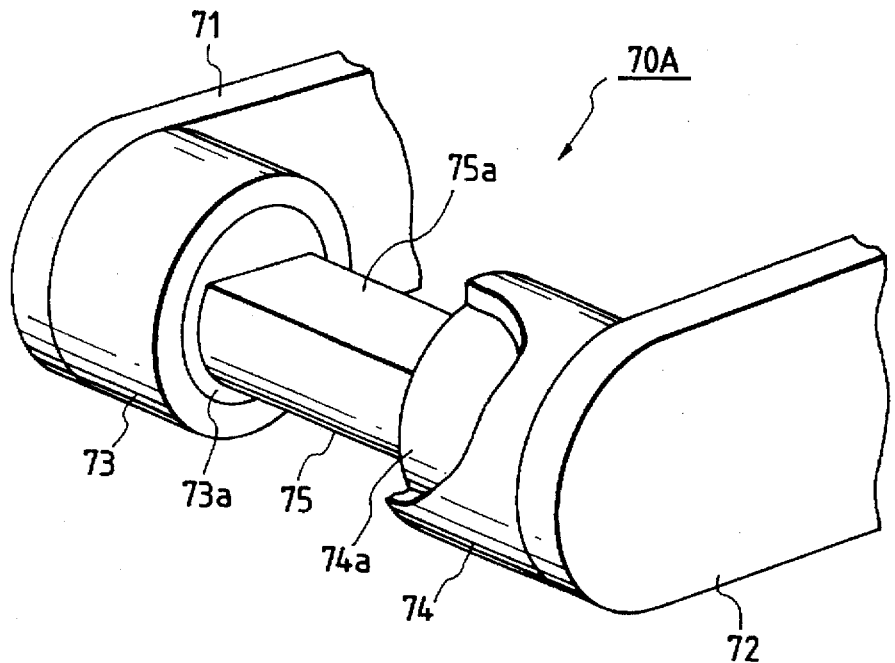
FIG. 9 is a perspective view, partly broken, of a hinge portion.

FIG. 9 is a perspective view, partly broken, of one hinge portion. In detail, each hinge portion consists of a pair of left and right projecting portions (brackets) 71, 72, friction outer casings 74 arranged as opposed to each other on inner surfaces of distal end portions of the pair of left and right projecting portions 71, 72, inner rings 73a, 74a internally fitting with the friction outer casings 74, and a D-cut shaft (support shaft) 75 fixed between the inner rings 73a and 74a. Numeral 75a represents a D-cut surface of the shaft 75. Here, the D-cut surfaces 75a of support shafts 75, 75 of upper hinge portions 70A, 70A face up, while the D-cut surfaces 75a of support shafts 75, 75 of lower hinge portions 70B, 70B face down. The inner rings 73a, 74a are rotatable with application of a certain load on the friction external casings 73, 74. Accordingly, the D-cut shaft 75 as a support shaft integral with the inner rings 73a, 74a is also rotatable with application of a certain load.

Figure 10:
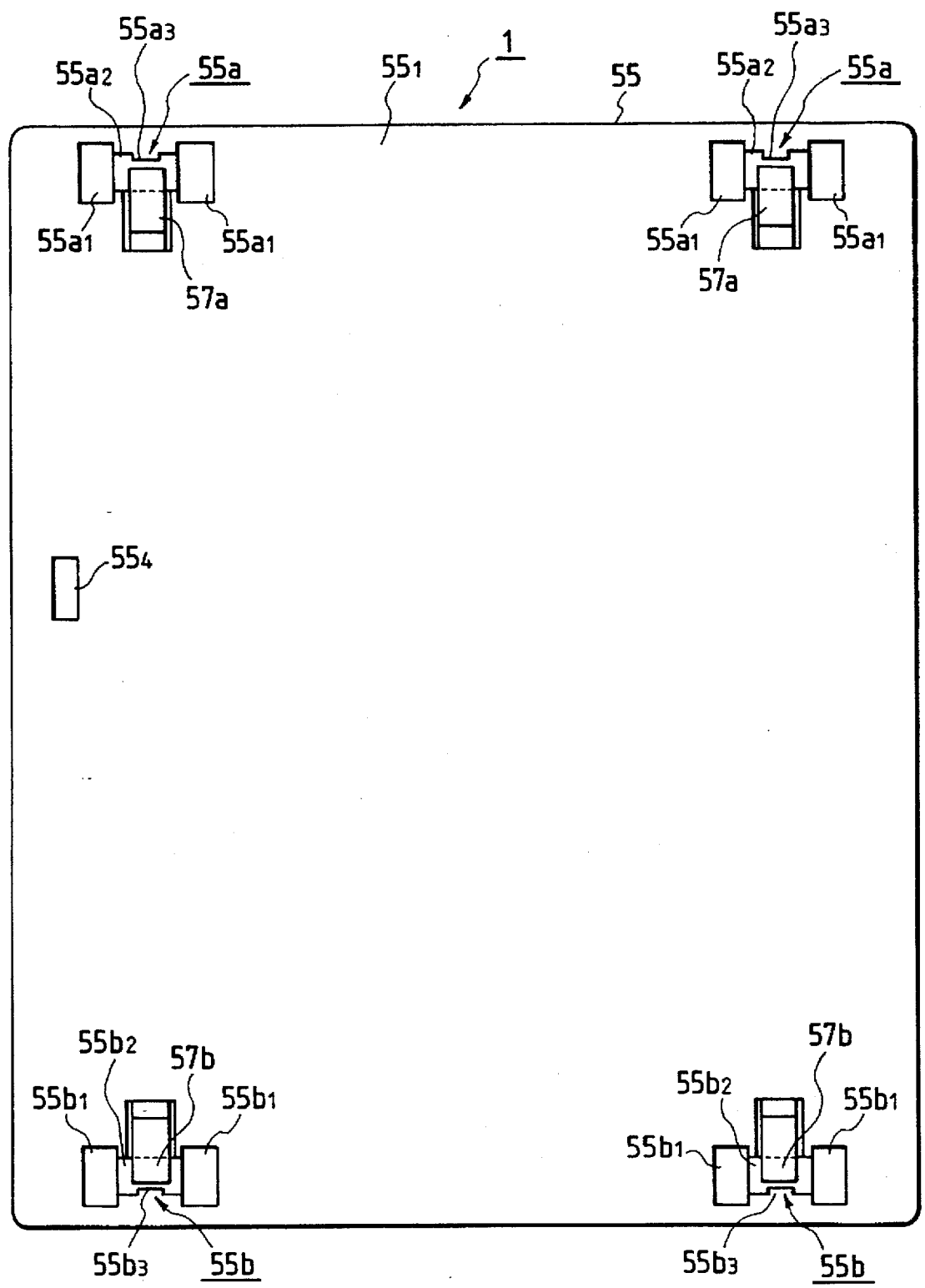
FIG. 10 is a rear elevation of the display device.

FIG. 10 is a rear elevation of the display device 1. On a back panel $55_1$ of a housing cover 55 of the display device 1 there are recess portions 55a, 55a and 55b, 55b having a U-shaped transverse cross section to be engaged with the hinge portions 70A, 70A and 70B, 70B at the four corners in correspondence with the hinge portions 70A, 70A and 70B, 70B provided at the four corners of the above-described front panel 80a of the apparatus body. The U-shaped recess portions have the same shape.

Figure 11:
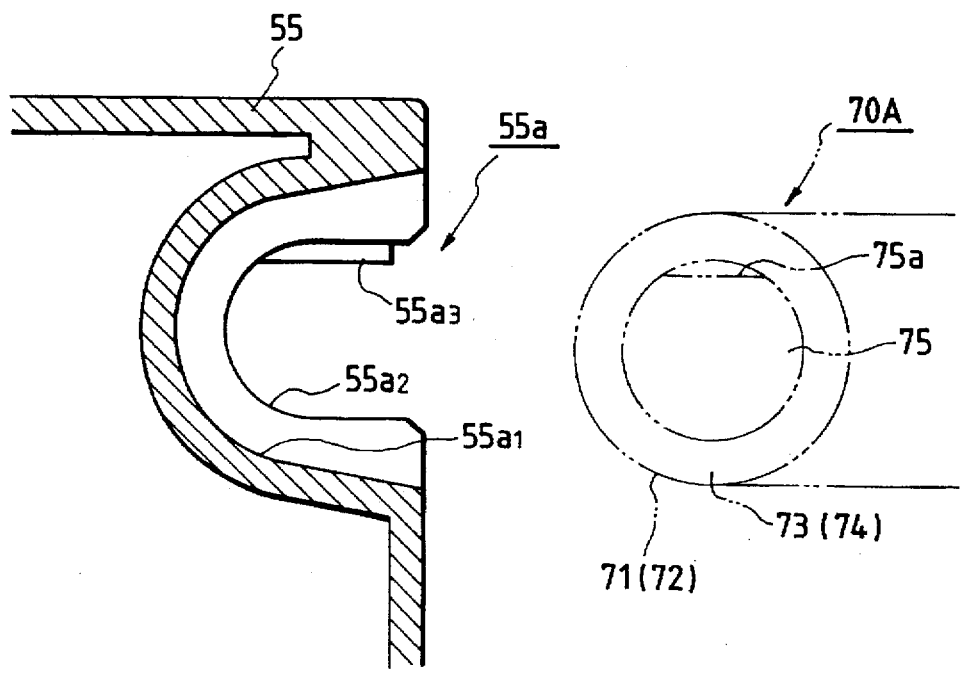
FIG. 11 is a cross-sectional view of a U-shaped recess portion.

FIG. 11 is an enlarged, transverse, cross-sectional side view of one U-shaped recess portion. Correspondently put into larger-diameter recess portions $55a_1$, $55a_1$ ($55b_1$, $55b_1$) on the both end sides of each U-shaped recess portion are the distal ends of the pair of left and right projecting portions 71, 72 and the friction outer casings 73, 74 of the hinge portion 70A (70B). Also, the D-cut shaft 75 is put into a middle recess portion $55a_2$ ($55b_2$) in correspondence therewith. Further, $55a_3$ ($55b_3$) is a portion correspondently associated with the D-cut surface 75a of the D-cut shaft 75.

In the vertical, cross-sectional side view of the display device 1 of FIG. 4 and the plan view, partly broken, of FIG. 5, numeral 50 designates a thin display using a liquid crystal etc., set in a front frame of the housing cover 55, and 51 a base to which the display 50 is fixed. The base is supported on the housing cover 55 by fixing it on inward bosses 55c integrally provided with the housing cover 55, in an incorporated manner.

Figure 12:
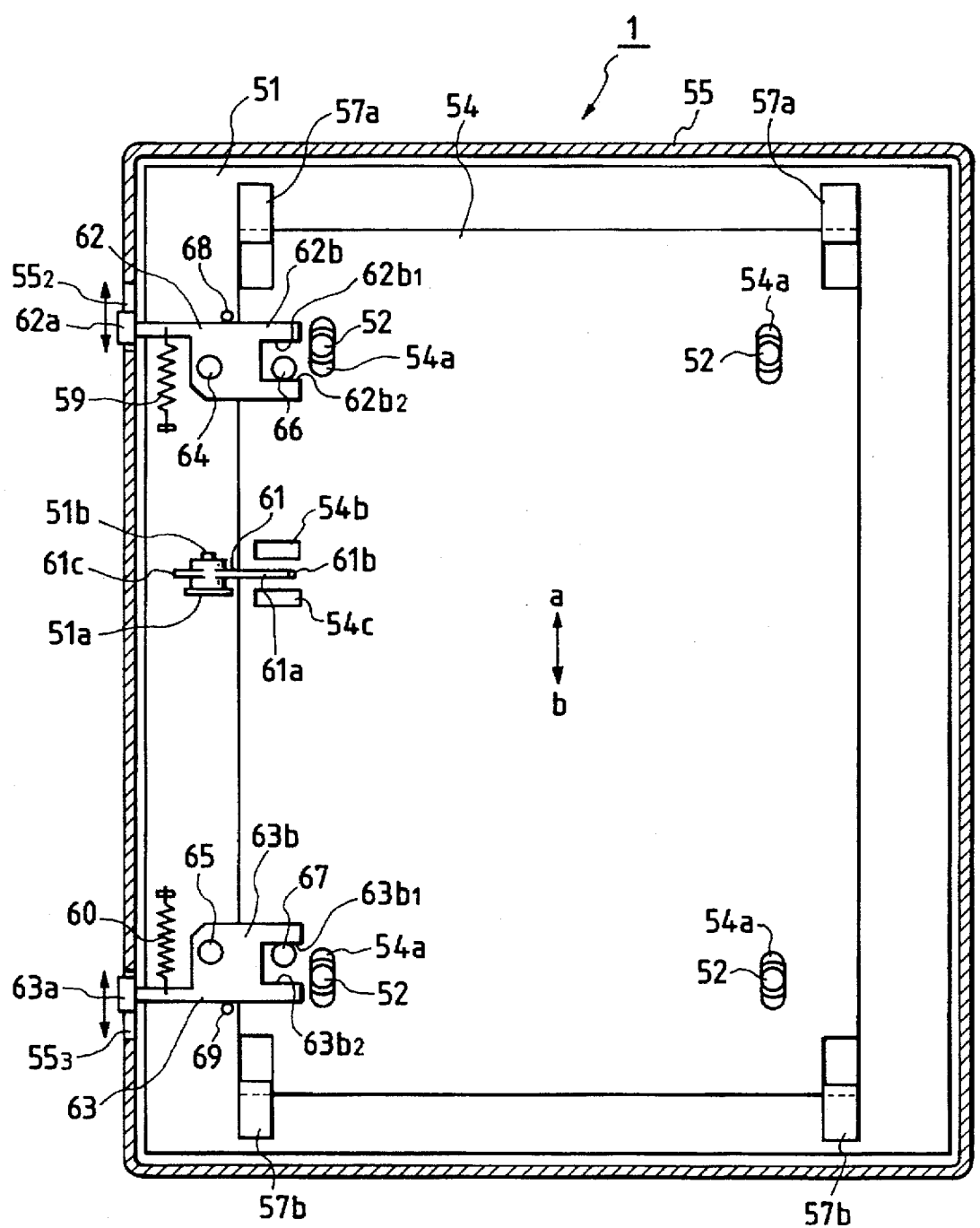
FIG. 12 is a rear elevation of the inside of the display device.

Numeral 54 denotes a slide plate disposed between the base 51 and the back panel $55_1$ of the housing cover 55. FIG. 12 is a rear elevation of the inside of the display device 1 to show the back side of the slide plate 54, removing the back panel $55_1$ of the housing cover 55.

This slide plate 54 is slidable in vertical directions of arrows a, b in FIG. 12 within the range of the length of elongate holes 54a, because stepped pins 52 provided at the four corners on the back surface of the base 51 are fit in the associated vertically elongate holes 54a provided at the four corners of the slide plate 54.

A pair of claw members 57a, 57a extend upward on the both, left and right, sides in the upper edge portion of the slide plate 54, while a pair of claw members 57b, 57b extend downward in the both, left and right, edge portions on the lower edge side.

As shown in FIG. 12, two, first and second, control levers 62, 63 are provided on upper and lower sides on the back surface and on the left side of the base 51 in FIG. 12.

The first control lever 62 is rotatable clockwise or counterclockwise about a pin shaft 64 planted in the base 51, and one arm 62a is fit in a vertical window $55_2$ provided on the side wall of the housing cover 55 so as to be exposed as a control knob to the outside. Another arm 62b is a bifurcated fork, and a first pin 66 planted on the back surface of the slide plate 54 is located between upper and lower legs $62b_1$ and $62b_2$ of the bifurcated fork 62b. The first control lever 62 is always biased in the direction of counterclockwise rotation about the pin shaft 64 by a spring 59, and is kept to be stopped in contact with a stopper pin 68 in a free state. In this state, the upper surface of the lower leg $62b_2$ of the bifurcated fork 62b is in contact with the lower surface of the first pin 66.

The second control lever 63 is rotatable clockwise or counterclockwise about a pin shaft 65 planted in the base 51, and one arm 63a is fit in a vertical window $55_3$ provided on the side wall of the housing cover 55 so as to be exposed as a control knob to the outside. Another arm 63b is a bifurcated fork, and a second pin 67 planted on the back surface of the slide plate 54 is located between upper and lower legs $63b_1$ and $63b_2$ of the bifurcated fork 63b. The second control lever 63 is always biased in the direction of clockwise rotation about the pin shaft 65 by a spring 60, and is kept to be stopped in contact with a stopper pin 69 in a free state. In this state, the lower surface of the upper leg $63b_1$ of the bifurcated fork 63b is in contact with the upper surface of the second pin 67.

Numeral 51a denotes a louvering portion provided in the base 51 at a nearly middle position between the first and second control levers 62, 63 set on the upper side and on the lower side, and 61 a lock lever rockable back and forth about a pin 51b planted in the louvering portion 51a with respect to the slide plate 54. The lock lever 61 is always biased in the direction of counterclockwise rotation in FIG. 5 by a biasing spring not shown.

Further, 54b, 54c (FIG. 12) are two, first and second, lock holes provided on the upper side and on the lower side in the slide plate 54, and a locking hook 61b at the distal end of one arm 61a of the lock lever 61 is to be engaged with or disengaged from either one of the two holes.

(i) When the first and second control levers 62, 63 are in a free state, the slide plate 54 is kept at a middle height position where the first pin 66 is received or stopped from descending by the upper surface of the lower leg $62b_2$ of the bifurcated fork 62b in the first control lever 62, as shown in FIG. 12.

Also, the lock lever 61 is in a state where the locking hook 61b is in contact with a portion of the back surface of the slide plate at the nearly middle position between the first and second lock holes 54b and 54c in the slide plate 54.

In this state, the upward claw members 57a, 57a on the upper edge side of the slide plate 54 are in a shift state to close approximately lower halves of the opening portions of the associated upper U-shaped recess portions 55a, 55a. Also, the downward claw members 57b, 57b on the lower edge side of the slide plate 54 are positioned in a state to close approximately upper halves of the opening portions of the associated lower U-shaped recess portions 55b, 55b.

(ii) In this state of FIG. 12, when the control knob 62a of the first control lever 62 is moved upward against the spring 59 by finger, the first control lever 62 is rotated clockwise about the pin shaft 64 to lower the bifurcated fork 62b. With it, the first pin shaft 66, thus, the slide plate 54 descends (or moves in the direction of b) by its own weight, before it reaches a stopped state where the upper edges of the vertically elongate holes 54a at the four corners of the slide plate 54 are in contact with the upper surfaces of the stepped pins 52.

The descending motion b of the slide plate 54 causes the first lock hole 54b on the upper side to face the locking hook 61b of the lock lever 61, so that the locking hook 61b drops into the first lock hole 54b to be engaged therewith, thus keeping the slide plate 54 locked at the down position.

In the descent state of the slide plate 54, the upward claw members 57a, 57a are lowered to make the upper U-shaped recess portions 55a, 55a completely open. On the other hand, because the downward claw members 57b, 57b are also lowered, the opening portions of the lower U-shaped recess portions 55b, 55b are completely closed by the claw members 57b, 57b.

(iii) In the state of FIG. 12, when the control knob 63a of the second control lever 63 is moved downward against the spring 60 by finger, the second control lever 63 is rotated counterclockwise about the pin shaft 65 to raise the bifurcated fork 63b. On the way of rise of the bifurcated fork 63b the upper surface of the lower leg $63b_2$ of the bifurcated fork 63b comes to contact the lower surface of the second pin 67. Subsequently rotating the second control lever 63 counterclockwise against the weights of the spring 60 and slide plate 54, the slide plate 54 ascends (or moves in the direction of a), before it reaches a stopped state where the lower edges of the vertically elongate holes 54a at the four corners of the slide plate 54 are in contact with the lower surfaces of the stepped pins 52.

The above ascending movement a of the slide plate 54 causes the second lock hole 54c on the lower side to face the locking hook 61b of the lock lever 61, so that the locking hook 61b drops into the second lock hole 54c to be engaged therewith, thus keeping the slide plate 54 locked at the up position.

In the ascent state of the slide plate 54, the upward claw members 57a, 57a are raised to make the upper U-shaped recess portions 55a, 55a completely closed by the claw members 57a, 57a. On the other hand, because the downward claw members 57b, 57b are also raised, the opening portions of the lower U-shaped recess portions 55b, 55b are kept completely open.

(a) Mounting of the display device 1 onto the apparatus body 80

A mounting operation of the display device 1 onto the apparatus body 80 is carried out as follows. As described in above (ii), the operation of the first control lever 62 lowers (or moves in the direction of b) the slide plate 54 so as to completely open the upper U-shaped recess portions 55a, 55a of the display device 1.

Matching the upper U-shaped recess portions 55a, 55a the opening portions of which are open, with the upper hinge portions 70A, 70A of the front panel 80a in the apparatus body 80, the upper U-shaped recess portions 55a, 55a are hooked on the upper hinge portions 70A, 70A, as shown in FIG. 13.

Then a jig such as a screwdriver is put into the hole $55_4$ provided in the back panel $55_1$ of the housing cover 55 of the display device 1 to push the other arm 61c of the lock lever 61. This rotates the lock lever 61 clockwise about the pin 51b against the spring biasing it in the direction of counterclockwise rotation, so that the locking hook 61b leaves the first lock hole 54b to release locking at the descent position of the slide plate 54. This locking release causes the slide plate 54 to ascend (or move in the direction of a) with counterclockwise rotation of the first lever 62 due to the spring 59 and then to return to the middle height position of FIG. 12.

The ascent of the slide plate 54 to the middle height position causes the upward claw members 57a, 57a of the slide plate 54 to close approximately lower half portions of the opening portions of the upper U-shaped recess portions 55a, 55a, as shown in FIG. 14, thereby stopping unhooking of the upper U-shaped recess portions 55a, 55a from the hinge portions 70A, 70A.

Next, the second control lever 63 is rotated to raise (or move in the direction of a) the slide plate 54, as in above (iii). This raises the downward claw members 57b, 57b so as to leave the opening portions of the lower U-shaped recess portions 55b, 55b, thereby completely opening the opening portions of the lower U-shaped recess portions 55b, 55b. Then the display device 1 is rotated to the front panel 80a of the apparatus body 80 about the upper hinge portions 70A, 70A to make hooking engagement between the lower U-shaped recess portions 55b, 55b and the lower hinge portions 70B, 70B.

At this time, the pin 76 provided on the front panel 80a of the apparatus body 80 matches with the hole $55_4$ provided on the back panel $55_1$ of the housing cover 55 in the display device 1, so that the distal end of the pin 76 goes into the display device 1, whereby the distal end of the pin 76 pushes the other arm 61c of the lock lever 61. This causes the lock lever 61 to rotate clockwise about the pin 51b against the spring biasing it in the direction of counterclockwise rotation, so that the locking hook 61b leaves the second lock hole 54c, thus releasing the locking at the ascent position of the slide plate 54.

This locking release causes the slide plate 54 to descend (or move in the direction of b) by its own weight and then to return to the middle height position of FIG. 12. This descent of the slide plate 54 to the middle height position causes the downward claw members 57b, 57b of the slide plate 54 to close approximately upper halves of the opening portions of the lower U-shaped recess portions 55b, 55b, thereby stopping unhooking of the lower U-shaped recess portions 55b, 55b from the lower hinge portions 70B, 70B.

After completion of the above operation, the upper and lower claw members 57a, 57a and 57b, 57b come to stop disengagement of the upper U-shaped recess portions 55a, 55a from the upper hinge portions 70A, 70A and disengagement of the lower U-shaped recess portions 55b, 55b from the lower hinge portions 70B, 70B, whereby the display device 1 is mounted and held in the standard angular posture as shown in FIG. 4 on the front panel 80a of the apparatus body 80.

Employing inverse procedures to the above operation, another possible method is such that hooking engagement is first made between the lower U-shaped recess portions 55b, 55b of the display device 1 and the lower hinge portions 70B, 70B, and hooking engagement is next made between the upper U-shaped recess portions 55a, 55a and the upper hinge portions 70A, 70A, whereby the display device 1 is mounted and held in the standard angular posture as shown in FIG. 4 on the front panel 80a of the apparatus body 80.

(b) Tilting operation of the display device 1 into the elevation posture

For tilting the display device 1 from the state of standard angular posture thereof of FIG. 4 relative to the apparatus body 80 into the elevation posture at a desired angle as shown in FIG. 6, the second control lever 63 is first rotated as in above (iii) to raise (or move in the direction of a) the slide plate 54 so as to make the opening portions of the lower U-shaped recess portions 55b, 55b completely open, whereby the disengagement stop is released between the lower U-shaped recess portions 55b, 55b and the lower hinge portions 70B, 70B, and then the display device 1 is rotated into the elevation posture at a desired angle about the upper hinge portions 70A, 70A.

In this case, the rotation of the display device 1 into the above elevation posture causes the display device 1 to go away from the pin 76 on the apparatus body 80, so that the press on the arm 61c of lock lever 61 is released and the locking hook 61b drops into the second lock hole 54c in the slide plate 54 thus raised (or moved in the direction of a) to lock the slide plate 54 at the ascent position.

This locking keeps the opening portions of the upper U-shaped recess portions 55a, 55a completely closed by the upward claw members 57a, 57a, as shown in FIG. 6.

Since the support shafts 75, 75 of the upper hinge portions 70A, 70A are rotatable with application of a certain load, as described previously, the display device 1 is stably held overcoming its own weight at the position of elevation posture as adjusted at a desired angle about the support shafts 75, 75.

When the display device 1 is returned from the elevation posture at the desired angle to the standard angular posture of FIG. 4, the display device 1 is reversely rotated about the upper hinge portions 70A, 70A. The lower U-shaped recess portions 55b, 55b with the opening portions being open come to engage with the lower hinge portions 70B, 70B. When the display device 1 is fully rotated back, the pin 76 pushes the lock lever 61 so as to force the locking hook 61b out of the second lock hole 54c, which releases the locking at the ascent position of the slide plate 54 to bring the slide plate 54 back to the middle height position. The return of the slide plate 54 to the middle height position brings the lower U-shaped recess portions 55b, 55b and the lower hinge portions 70B, 70B into the disengagement stop state through the downward claw members 57b, 57b. Namely, the display device 1 in the elevation posture at the desired angle of FIG. 6 is returned into the mount state in the standard angular posture of FIG. 4.

(c) Tilting operation of the display device into the depression posture

For tilting the display device 1 from the state of standard angular posture thereof of FIG. 4 relative to the apparatus body 80 into the depression posture at a desired angle as shown in FIG. 7, the first control lever 62 is first rotated as in above (ii) to lower (or move in the direction of b) the slide plate 54 so as to make the opening portions of the upper U-shaped recess portions 55a, 55a completely open, whereby the disengagement stop is released between the upper U-shaped recess portions 55a, 55a and the upper hinge portions 70A, 70A, and then the display device 1 is rotated into the depression posture at a desired angle about the lower hinge portions 70B, 70B.

In this case, the rotation of the display device 1 into the above depression posture causes the display device 1 to go away from the pin 76 on the apparatus body 80, so that the press on the arm 61c of lock lever 61 is released and the locking hook 61b drops into the first lock hole 54b in the slide plate 54 thus lowered (or moved in the direction of b) to lock the slide plate 54 at the descent position.

This locking keeps the opening portions of the lower U-shaped recess portions 55b, 55b completely closed by the downward claw members 57b, 57b, as shown in FIG. 7.

Since the support shafts 75, 75 of the lower hinge portions 70B, 70B are rotatable with application of a certain load, as described previously, the display device 1 is stably held overcoming its own weight at the position of depression posture as adjusted at a desired angle about the support shafts 75, 75.

When the display device 1 is returned from the depression posture at the desired angle to the standard angular posture of FIG. 4, the display device 1 is reversely rotated about the lower hinge portions 70B, 70B. The upper U-shaped recess portions 55a, 55a with the opening portions being open come to engage with the upper hinge portions 70A, 70A. When the display device 1 is fully rotated back, the pin 76 pushes the lock lever 61 so as to force the locking hook 61b out of the first lock hole 54b, which releases the locking at the descent position of the slide plate 54 to bring the slide plate 54 back to the middle height position. The return of the slide plate 54 to the middle height position brings the upper U-shaped recess portions 55a, 55a and the upper hinge portions 70A, 70A into the disengagement stop state through the upward claw members 57a, 57a. Namely, the display device 1 in the depression posture at the desired angle of FIG. 7 is returned into the mount state in the standard angular posture of FIG. 4.

Figure 15:
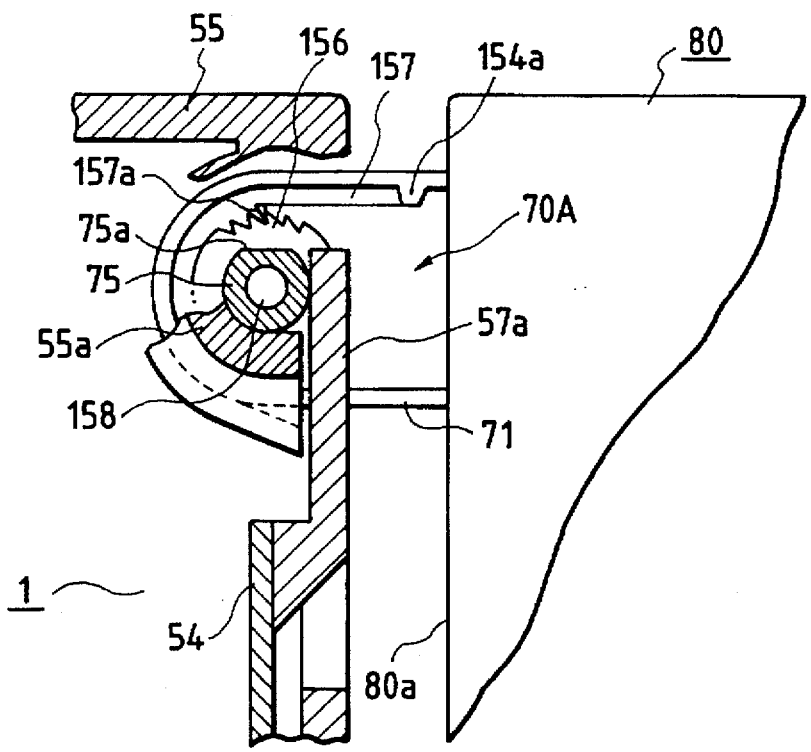
FIG. 15 is a cross-sectional view of a hinge portion utilizing a ratchet mechanism in an apparatus of embodiment 2.
Figure 16:
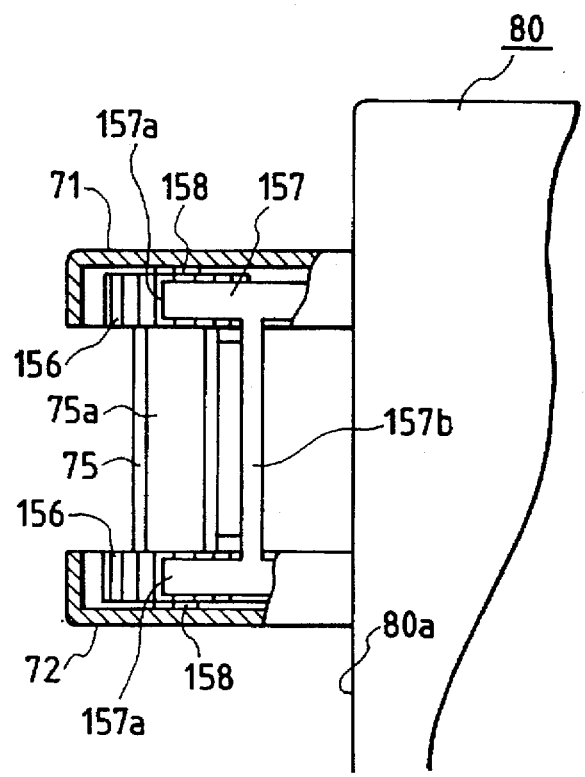
FIG. 16 is a broken plan view of the portion of FIG. 15.

<Embodiment 2> (FIG. 15 and FIG. 16)

The present embodiment employs a ratchet mechanism in the hinge portion 70A (70B) for supporting the display device 1 on the front panel 80a of the apparatus body 80, whereby the support shaft 75 can freely rotate only in one direction. FIG. 15 is a broken side view of a hinge portion, and FIG. 16 a broken plan view thereof.

The support shaft 75 of the hinge portion 70A is set between left and right projecting portions (brackets) 71, 72 so as to be rotatable about a shaft 158. Ratchets 156, 156 are incorporated with the support shaft 75. Numeral 157 designates a plate spring having a pawl 157a, the base of which is mounted on a seat 154a of the projecting portion 71, 72.

When the pawl 157a at the distal end of plate spring 157 is meshed with the ratchet 156 as shown in FIG. 15, the ratchet 156 cannot rotate counterclockwise but can rotate only clockwise. Accordingly, when the U-shaped recess portion 55a on the display device 1 is engaged with the D-cut surface 75a of the support shaft 75 in the hinge portion 70A on the apparatus body 80, i.e., when the support shaft 75 and the display device 1 are incorporated with each other, a motion is free in the direction to tilt the display device 1, but no motion is allowed in the returning direction.

Accordingly, as compared with the apparatus of embodiment 1 as described above, the stiffness is increased in the direction to return the display device 1, and the operability is improved, because, in pressing a key switch 20 in the display device 1, there is no movement of the display device 1 even with a too strong force applied thereon. Further, the operability to tilt the display device 1 is also excellent, because it can be lightly moved in the direction to tilt.

To return the display device 1 to the original state, the operator moves the control knob, as with the previously described apparatus of embodiment 1, to move the slide plate 54, thus the claw members 57a, further upward from the state of FIG. 15. This motion causes the fore end 57a of the claw member 57a to push a portion 157b of the plate spring 157 so as to disengage the pawl 157a from the ratchet 156, whereby the support shaft 75 becomes rotatable counterclockwise so as to allow the display device to be returned to the original position.

Since the constitution, operation, etc. of the present embodiment except for the above are the same as those for the apparatus of embodiment 1, redundant description is omitted herein.

Figure 17A:
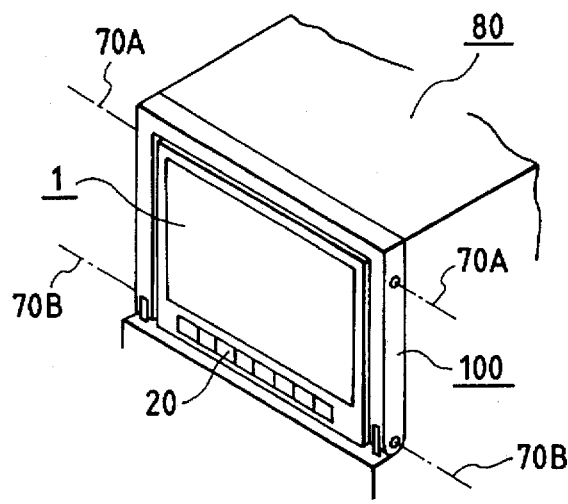
Figure 17B:
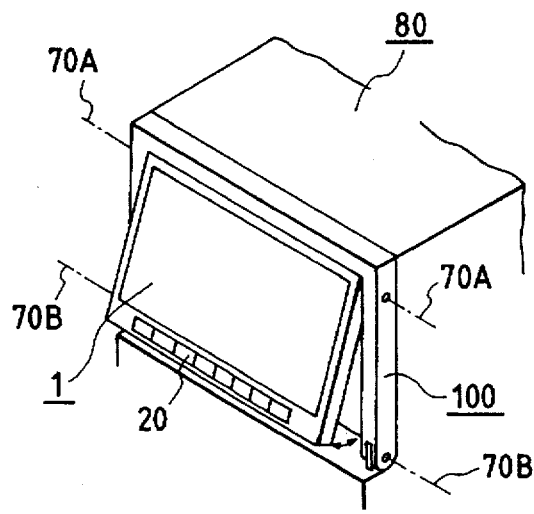
Figure 17C:
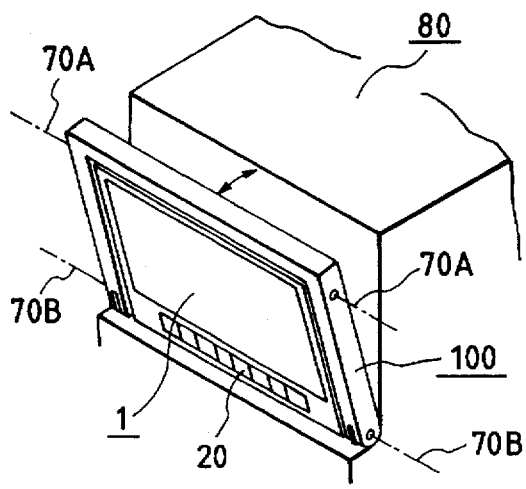

<Embodiment 3> (FIGS. 17A to 17C)

An apparatus of the present embodiment is so arranged that a C-shaped frame 100 is provided on the front surface side of the apparatus body 80 with legs being connected at the lower ends thereof to the apparatus body 80 so as to be rotatable about lower hinge portions 70B and that the display device 1 is set in the C-shaped frame 100 with the upper side being connected to the frame 100 so as to be rotatable about an upper hinge portion 70A relative to the frame 100. The each lower hinge portion 70B is connected to the apparatus body 80 through a friction member so that the C-shaped frame 100 is stably held in a rotated state when it is rotated relative to the apparatus body 80. Also, the upper hinge portion 70A is connected to the frame 100 through a friction member so that a rotated state of the display device 1 is stably held when the display device 1 is rotated relative to the C-shaped frame 100.

The display device 1 is held in the standard angular posture as shown in FIG. 17A when the C-shaped frame 100 is rotated about the lower hinge portions 70B to be folded onto the front surface of the apparatus body 80 and when the display device 1 is rotated about the upper hinge portion 70A to be folded into the C-shaped frame 100.

When the display device 1 is desired to be tilted into the elevation posture at a desired angle, the display device 1 folded in the C-shaped frame 100 is rotated upward to a desired angle about the upper hinge portion 70A while keeping the C-shaped frame 100 as folded on the front surface of the apparatus body 80, as shown in FIG. 17B.

When the display device 1 is desired to be tilted into the depression posture at a desired angle, the C-shaped frame 100 is rotated downward to a desired angle about the lower hinge portion 70B while keeping the display device 1 as folded in the C-shaped frame 100, as shown in FIG. 17C.

As described above, according to the present invention, no space is required for avoiding interference with the apparatus body in tilting the display device, which permits the apparatus to be constructed approximately in the same size as the apparatus with the display device fixed, regardless of an amount of tilt.

Where the display device 1 is provided with the control key switches 20 etc. as in the apparatus shown by the embodiments, the key switches 20 will never be drawn backward but come forward upon tilting, which would never degrade the operability of key switches 20.

In that case, an amount of movement of the key switches 20 is about a half of that for example where the display device is arranged to be tilted only about the upper support shaft.

The above embodiments were arranged with the upper and lower hinge portions provided for elevation or depression of the display device, but it is needless to mention that the same effects can be achieved by such an arrangement that the hinge portions are provided on the left and right sides so as to allow the display device to be rotated leftward or rightward.

In embodiments 1 and 2, because the hinge portions (70A, 70B) and the U-shaped recess portions (55a, 55b) to be engaged with each other are relative, they may be reversed from the relation in the embodiments in such a manner that the hinge portions (70A, 70B) are provided on the display device 1 while the U-shaped recess portions (55a, 55b) on the apparatus body 80.

What is claimed is:

1. An electronic apparatus having a flat type display device, comprising:
    a first hinge portion for directly connecting one end portion of said display device to an apparatus body to keep said display device at a first posture, said first hinge portion being changeable between a state where it connects said display device to said apparatus body and a state where said display device is unconnected from said apparatus body;
    a second hinge portion for directly connecting the other end of said display device to said apparatus body to keep said display device at a second posture which is different than said first posture, said second hinge portion being changeable between a state where it connects said display device to said apparatus body and a state where said display device is unconnected from said apparatus body, said second posture being a posture in which one of said first and second hinge portions is in the disconnected state; and
    means for selectively releasing either the connection of the first hinge portion or the connection of said second hinge portion.

2. The apparatus according to claim 1, wherein said first hinge portion connects an upper side of said display device to said apparatus body, said second hinge portion connects a lower side of said display device to said apparatus body, and said display device can be inclined to the first posture by said first hinge portion and to the second posture by said second hinge portion.

3. The apparatus according to claim 1, wherein said first hinge portion connects a left side of said display device to said apparatus body and said second hinge portion connects a right side of said display device to said apparatus body.

4. The apparatus according to claim 1, wherein said hinge portions each comprise a shaft to become rotational fulcrum, and a support member for rotatably supporting said shaft and holding said shaft at an arbitrary rotational position and wherein said shaft can be engaged with or disengaged from the support member.

5. The apparatus according to claim 1, wherein said hinge portions for rotating the display device each have a projecting portion having a shaft to become a support shaft for the display device, a U-shaped recess portion to be engaged therewith, a claw member arranged to slide to close an opening portion of said U-shaped recess portion, and control means for controlling a motion of said claw member in such a manner that, in a state where the display device is in engagement with the both hinge portions provided in upper and lower portions of the apparatus, said claw member is allowed to slide to open the opening portion of the U-shaped recess portion so that only either one of the upper and lower shafts engaged with the U-shaped recess portions can be disengaged, and that, in a state where the display device is tilted while one of the upper and lower hinge portions is disengaged, the shaft, provided in said projecting portion, to become the support shaft is kept not to be disengaged from the engaged state with the U-shaped recess portion.

6. The apparatus according to claim 1, wherein the hinge portions for tilting the display device freely rotate in a direction to tilt the display device, but fix the display device in a return direction before released by releasing means.

7. The apparatus according to claim 1, wherein said display device has a keyboard on a front surface thereof.

8. The apparatus according to claim 1, wherein said display device is a liquid crystal display device.

9. The apparatus according to claim 1, wherein said display device can be attached to or detached from the apparatus body.

10. The apparatus according to claim 1, comprising:

a document mount table provided below the display device;

sheet feed means for feeding a document placed on said document mount table;

reading means for reading an image on the document thus fed to convert the image into an image signal;

means for displaying the image on said display device, based on the image signal from the reading means; and means for recording said image signal on a recording medium.

11. The apparatus according to claim 10, wherein a key switch is provided on a front surface of the display device.

12. The apparatus according to claim 1, further comprising means for, when one of said first and second hinge portions is released, prohibiting the other hinge portion from disengaging the connection.

13. The apparatus according to claim 12, having first releasing means for releasing hinge connection of one of the hinge portions, and second releasing means for releasing hinge connection of the other of the hinge portions, said releasing means each comprising a manually operated member.

14. An electronic apparatus having a flat type display device, comprising:

an apparatus body;

first connection means for directly, pivotally connecting one end of said display device to said apparatus body, said first connection means being changeable between a state where it connects said apparatus body and said display device and a state where said display device is unconnected from said apparatus body, said first connection means keeping said display device at a first posture when said display device and said apparatus body are directly connected;

second connection means for directly, pivotally connecting the other end of said display device to said apparatus body, said second connection means being changeable between a state where it connects said apparatus body and said display device and a state where said display device is unconnected from said apparatus body, said second connection means keeping said display device at a second posture different from said first posture when said display device and said apparatus body are connected, said second posture being a posture in which one of said first and second connection means is in the disconnected state; and means for selectively releasing the connection of either said first connection means or said second connection means.

15. An apparatus according to claim 14, further comprising means for prohibiting one of said first and second connection means from releasing when the other one of said connection means is released.

16. An apparatus according to claim 14, wherein said display device is kept at the first posture by said first connection means when said second connection member is released and said display device is kept at the second posture by said second connection means when said first connection means is released.

17. An apparatus according to claim 14, wherein said display device is disposed in front of said apparatus body and a keyboard is disposed in front of said display device.

18. An apparatus according to claim 14, wherein said display device comprises a liquid-crystal display.

19. An apparatus according to claim 14, wherein said display device displays data transmitted from said apparatus body.

20. An apparatus according to claim 14, wherein each said connection means includes a concave member and a projection member releasable connectable with said concave member, said connection being accomplished when said concave member and said projection member engage each other and disconnection being accomplished when said concave member and said projection member disengage each other.

21. An apparatus according to claim 20, wherein said release means includes a movable member for opening and closing an opening portion of said concave member, said projection member being prohibited from releasing from said concave member when said movable member moves to the opening portion of said concave member and said projection member becomes releasable from said concave member when said movable member moves from said opening portion of said concave member.

* * * * *

UNITED STATES PATENT AND TRADEMARK OFFICE
CERTIFICATE OF CORRECTION

PATENT NO. : 5,719,645
DATED : February 17, 1998
INVENTOR(S) : YOSHIHIRO SAITO, ET AL.

It is certified that error appears in the above-identified patent and that said Letters Patent is hereby corrected as shown below:

TITLE PAGE:
At [56] References Cited

FOREIGN PATENT DOCUMENTS

"4-04221989a" should read --4-04221989A--.

Column 3

Line 27, "apparatus." should read --the apparatus.--

Column 5

Line 44, "casings 74" should read --casings 73, 74--.
Line 47, "casings 74," should read --casings 73, 74--.

Column 12

Line 13, "etc." should read --etc.,--.
Line 33, "on" should read --are provided on--.

Signed and Sealed this

Twenty-fourth Day of November, 1998

Attest:

BRUCE LEHMAN

Attesting Officer

Commissioner of Patents and Trademarks